United States Patent Office 3,118,858
Patented Jan. 21, 1964

3,118,858
POLYEPOXIDE COMPOSITIONS AND PROCESS OF HARDENING THEM
Karl Frey, Binningen, Otto Ernst, Pfeffingen, and Willy Fisch, Binningen, Switzerland, assignors to Ciba Limited, Basel, Switzerland, a Swiss firm
No Drawing. Filed Aug. 25, 1954, Ser. No. 452,202
Claims priority, application Switzerland Aug. 28, 1953
16 Claims. (Cl. 260—47)

It is known to use a polycarboxylic anhydride for hardening polyepoxide compounds. As polyepoxide compounds there are to be understood the condensation products obtainable in known manner by reacting a polyhydric phenol, especially a polyhydric polynuclear phenol, or an aliphatic polyhydric alcohol with an epihalogen hydrin or a dihalogen hydrin in an alkaline medium. There are advantageously used as polyepoxide compounds those obtained from 4:4'-dihydroxydiphenyldimethyl methane, and among these products there are especially suitable those having a content of four or more gram equivalents of epoxide groups per kilogram of polyepoxide compound.

For preparing casting, coating or dipping compositions, adhesive or impregnating agents, spreadable compositions or the like based on polyepoxide compounds it has often proved a disadvantage that the polyepoxide-hardener mixtures have too short a usable life, especially when the mixtures are used at a high temperature, at which, as is known, the hardening process takes place more rapidly and the viscosity increases more quickly than it does at low temperatures.

It is also desirable to work with a homogeneous polyepoxide-hardener mixture. It has already been tried to obtain a homogeneous distribution at low temperatures by adding toluene, benzene or another solvent to the anhydride and the polyepoxide compound. However, this expedient is unsuitable in all cases in which the presence of solvents is undesirable. When no solvent is used, for example, in the production of castings, it is not possible to work at any desired temperature, because the temperature at which homogeneous distribution is ensured depends primarily on the properties of the polycarboxylic anhydride used. Thus, the usable life of a polyepoxide-hardener mixture depends primarily on the saturation temperature of the polycarboxylic acid anhydride used. By the "saturation temperature" of an anhydride is meant the lowest temperature at which a certain quantity of the anhydride in a certain quantity of a polyepoxide compound still remains in solution. When this temperature is lowered, part of the anhydride separates in dispersed form. Generally speaking, high melting polycarboxylic anhydrides have a high saturation temperature, as a result of which they impart only a short usable life to polyepoxide-hardener mixtures in which they are incorporated.

The present invention is based on the observation that the usable life of polyepoxide-hardener mixtures can be prolonged with the aid of high melting polycarboxylic anhydrides, by using a mixture of anhydrides. Advantageously a mixture of high and low melting polycarboxylic anhydrides is used.

Accordingly, this invention provides a process for hardening polyepoxide compounds with polycarboxylic anhydrides, wherein a mixture of polycarboxylic anhydrides is used, at least one component being a high melting polycarboxylic anhydride. This process also possesses the advantage that it can also be used in the absence of a solvent, that is to say in cases where the presence of a solvent is undesirable.

For the purposes of this invention high melting polycarboxylic anhydrides are those which melt above 100° C., for example phthalic anhydride, tetrachlorophthalic anhydride, hexachloro-endomethylene tetrahydrophthalic anhydride, succinic anhydride, anhydrides of polybasic aromatic carboxylic acids, certain addition products of maleic anhydride with diene components, and other anhydrides.

There may be used mixtures of different high melting anhydrides or mixtures of high melting anhydrides and low melting anhydrides, for example, maleic anhydride or hydrogenated phthalic anhydrides such as tetrahydro- or hexahydro-phthalic anhydrides. These mixtures may contain any desired ratios of the components. There may be used, for example, mixtures which are so prepared that the melting point of the mixture is either lower than the melting point of the second highest melting component or lower than the melting point of the lowest melting component. Finally, there may be used, for example, a eutectic mixture.

It has been found that hardened products having especially good mechanical properties are obtained by using 0.7 to 1.0 gram equivalent of anhydride groups for every gram equivalent of epoxide groups, and advantageously 0.8 to 0.9 gram equivalent of anhydride groups for every gram equivalent of epoxide groups.

Known pigments, color-producing substances or filling materials may be added to the polyepoxide-hardener mixture or the components thereof.

The following examples illustrate the invention, the parts and percentages being by weight. The polyepoxide compounds used in Examples 1–5 are prepared in known manner from 4:4'-dihydroxydiphenyl-dimethylmethane with an excess of epichlorhydrin in the presence of sodium hydroxide. The polyepoxide compound described in Example 6 was prepared in an analogous manner.

Example 1

The results of tests upon mixtures of anhydrides and epoxide compounds are given in the following table. The mixtures were prepared by dissolving 0.9 anhydride gram equivalent of the anhydride mixture at approximately its melting temperature in 1 gram equivalent of a polyepoxide compound, which contained 4.6 gram equivalents of epoxide groups per kilogram, and the mixture was cooled to the saturation temperature.

|  | Test No. | | | |
|---|---|---|---|---|
|  | 1 | 2 | 3 | 4[1] |
| Composition of hardener: | | | | |
| Phthalic anhydride, percent | 100 | 80 | 55 | 35 |
| Cis-Δ⁴-tetrahydro-phthalic anhydride, percent | 0 | 20 | 45 | 65 |
| Melting or solidification point of the anhydride or anhydride mixture, °C | 128 | 115 | 94.5 | 75.5 |
| Parts of anhydride or anhydride mixture per 100 parts polyepoxide compound | 61.5 | 61.7 | 62.1 | 62.3 |
| Saturation temperature of the anhydride or anhydride mixture, °C | 105 | 90 | 75 | 60 |
| Initial viscosity of the anhydride-polyepoxide mixture: | | | | |
| At °C | 105 | 90 | 75 | 60 |
| In cp | 20 | 35 | 50 | 90 |
| Period of use of the hardener-polyepoxide mixture: | | | | |
| At °C | 105 | 90 | 75 | 60 |
| Hours up to 1,500 cp | 5¼ | 14 | 32 | 55 |
| Hours up to 3,000 cp | 5½ | 15½ | 35 | 72 |

[1] Eutectic mixture.

Products hardened at 100–160° C., for example for 24–36 hours at 120° C. or for 10–14 hours at 140° C., with the anhydride mixtures used in tests Nos. 2, 3 and 4 have the same excellent mechanical and electrical properties as those of ethoxyline resins hardened with a single polycarboxylic anhydride. If in test No. 4 instead of 0.9 mol (62.3 grams) of anhyride gram equivalent there is used 0.8 mol (55.5 grams) or 1.0 mol (69.2 grams)

respectively, the periods of use are 47 and 65 hours respectively until a viscosity of 1500 cp. is reached.

The usable life of the polyepoxide-hardener mixtures can also be prolonged by adding a suitable quantity of a freshly prepared mixed anhydride-polyepoxide mixture to the unused portion of a batch of the mixture which has been used for a certain time. If, for example, 50 percent of the mixture used in test No. 4 has been consumed after working for 24 hours, and then the consumed portion is replaced by a freshly prepared mixed anhydride-polyepoxide mixture, the following results are obtained:

| Viscosity at 60° C. in cp. | After— | | | | |
|---|---|---|---|---|---|
| | 1 day | 3 days | 5 days | 9 days | 14 days |
| Before replacing the consumed portion | 430 | 700 | 750 | 850 | 850 |
| After replacing the consumed portion | 220 | 260 | 270 | 280 | 280 |

In this manner it is possible to work for many days while maintaining a relatively narrow viscosity range.

*Example 2*

Instead of the polyepoxide compound described in Example 1 there is used a polyepoxide compound having a content of epoxide groups amounting to 4.2 gram equivalents per kilogram, or 4.6 or 5.2 respectively. There are obtained in test No. 4 of Example 1 periods of use of 12, 33 and 71 hours respectively until a viscosity of 1500 cp. at 75° C. is reached.

*Example 3*

Instead of the polyepoxide compound described in Example 1 there was used a polyepoxide compound having a content of epoxide groups amounting to 4.75 gram equivalents per kilogram, 0.9 anhydride gram equivalent of the anhydride mixture being employed to one gram equivalent of polyepoxide compound. The hardening agents used and the results obtained are given in the following table:

| | Test No. | | |
|---|---|---|---|
| | 1 | 2[1] | 3 |
| Composition of hardener: | | | |
| Phthalic anhydride, percent | 100 | 35 | 24 |
| Cis-Δ⁴-tetrahydro-phthalic anhydride, percent | 0 | 65 | 45 |
| Cis-hexahydrophthalic anhydride, percent | 0 | 0 | 31 |
| Melting or solidification point of the anhydride or anhydride mixture, °C | 128 | 75.5 | 60 |
| Parts of anhydride or anhydride mixture per 100 parts of polyepoxide compound | 63.5 | 64.4 | 65.0 |
| Saturation temperature of the anhydride or anhydride mixture, °C | 105 | 60 | 45 |
| Initial viscosity of the anhydridepolyepoxide mixture: | | | |
| At °C | 105 | 60 | 45 |
| In cp | 20 | 80 | 250 |
| Period of use of the polyepoxide-hardener mixture: | | | |
| At °C | 105 | 60 | 45 |
| Hours up to 1,500 cp | 6¼ | 72 | 74 |
| Hours up to 3,000 cp | 6½ | 88 | 118 |

[1] Eutectic mixture.

*Example 4*

An anhydride mixture consisting of 25 parts of tetrachlorophthalic anhydride and 75 parts of phthalic anhydride was used. 76.6 parts of this mixture was dissolved at about 120° C. in 100 parts of a polyepoxide equivalent having a content of epoxide groups amounting to 4.9 gram equivalents per kilogram.

The anhydride mixture had a solidification point of 120° C. and the polyepoxide-hardener mixture had a usable life at 100° C. or 3 hours up to a viscosity of 1500 cp. The use of tetrachlorophthalic anhydride alone is unsuitable. Owing to its very high melting point of about 243° C. and the consequent very high melting temperature required to produce the polyepoxide tetrachlorophthalic anhydride-mixture the latter hardens out to a considerable extent before the anhydride is homogeneously dissolved in the polyepoxide compounds.

*Example 5*

For the tests given in the following table, 0.9 anhydride gram equivalents of the anhydride mixtures were dissolved at approximately their melting temperatures in one gram equivalent of a polyepoxide compound, and the mixture was cooled to the saturation temperature. The content of epoxide groups in the polyepoxide compound used amounted to 4.75 gram equivalents per kilogram.

| | Test No. | | | | |
|---|---|---|---|---|---|
| | 1 | 2 | 3 | 4[1] | 5 |
| Composition of hardener: | | | | | |
| Succinic anhydride, percent | 100 | 0 | 68 | 51 | 22 |
| Phthalic anhydride, percent | 0 | 100 | 32 | 49 | 22 |
| Cis—Δ⁴—tetrahydro-phthalic anhydride, percent | 0 | 0 | 0 | 0 | 56 |
| Melting or solidification point of the anhydride or anhydride mixture, °C | 115 | 128 | 98 | 88 | 68 |
| Parts of anhydride or anhydride mixture per 100 parts of polyepoxide compound | 42.7 | 63.2 | 49.3 | 58.8 | 59.5 |
| Saturation temperature of the anhydride or anhydride mixture, °C | 100 | 105 | 86 | 76 | 60 |
| Initial viscosity of the anhydride-polyepoxide mixture: | | | | | |
| At °C | 100 | 105 | 86 | 76 | 60 |
| In cp | 30 | 20 | 35 | 50 | 80 |
| Period of use of the polyepoxide-hardener mixture: | | | | | |
| At °C | 100 | 105 | 86 | 76 | 60 |
| Hours up to 1,500 cp | 17 | 6¼ | 26 | 38 | 50 |
| Hours up to 3,000 cp | 17¾ | 6½ | 29 | 47 | 81 |

[1] Eutectic mixture.

*Example 6*

Instead of the polyepoxide compounds from 4:4'-dihydroxy-diphenyl-dimethyl-methane used in Examples 1–5, there is used a polyepoxide compound from a dihydroxy-dicresyl-dimethyl-methane having a content of epoxide amounting to 4.5 gram equivalents per kilogram. 100 parts of this polyepoxide compound are mixed with 69 parts of anhydride mixture consisting of 52 parts of cis-hexahydrophthalic anhydride, 11 parts of cis-Δ⁴-tetrahydrophthalic anhydride and 6 parts of phthalic anhydride. There is obtained at 60° C. an initial viscosity of 80 cp., at 50° C. a viscosity of 120 cp., and at 40° C. a viscosity of 250 cp., with the corresponding periods of use.

What is claimed is:

1. A process of hardening a 1,2-polyepoxide reaction product of a halohydrin with a member of the group consisting of a polyhydric phenol and an aliphatic polyhydric alcohol, which comprises effecting the hardening by heating in the presence of a mixture of polybasic carboxylic acid anhydrides comprising phthalic anhydride and tetrahydrophthalic anhydride commingled with the 1,2-polyepoxide, the anhydride mixture being present in a proportion corresponding to from about 0.7 to about 1.0 gram equivalent of anhydride groups for each gram equivalent of epoxide groups.

2. A process of hardening a 1,2-polyepoxide reaction product of a halohydrin with a member of the group consisting of a polyhydric phenol and an aliphatic polyhydric alcohol, which comprises effecting the hardening by heating in the presence of a mixture of polybasic carboxylic acid anhydrides comprising phthalic anhydride, tetrahydrophthalic anhydride and hexahydrophthalic anhydride commingled with the 1,2-polyepoxide, the anhydride mixture being present in a proportion corresponding to from about 0.7 to about 1.0 gram equivalent of anhydride groups for each gram equivalent of epoxide groups.

3. A process of hardening a 1,2-polyepoxide reaction product of a halohydrin with a member of the group consisting of a polyhydric phenol and an aliphatic polyhydric alcohol, which comprises effecting the hardening by heating in the presence of a mixture of polybasic carboxylic acid anhydrides comprising phthalic anhydride, tetrahydrophthalic anhydride and succinic anhydride commingled with the 1,2-polyepoxide, the anhydride mixture being present in a proportion corresponding to from about 0.7 to about 1.0 gram equivalent of anhydride groups for each gram equivalent of epoxide groups.

4. A process of hardening a 1,2-polyepoxide reaction product of a halohydrin with a member of the group consisting of a polyhydric phenol and an aliphatic polyhydric alcohol, which comprises effecting the hardening by heating in the presence of a mixture of polybasic carboxylic acid anhydrides comprising phthalic anhydride and succinic anhydride commingled with the 1,2-polyepoxide, the anhydride mixture being present in a proportion corresponding to from about 0.7 to about 1.0 gram equivalent of anhydride groups for each gram equivalent of epoxide groups.

5. A process as claimed in claim 1, wherein a eutectic mixture of the polybasic carboxylic acid anhydrides is employed.

6. A process as claimed in claim 1, wherein the 1,2-polyepoxide is a glycidyl ether of 4:4'-dihydroxydiphenyl-dimethylmethane which contains at least 4 gram equivalents of epoxide groups per kilogram.

7. A composition of matter comprising a 1,2-polyepoxide reaction product of a halohydrin with a member of the group consisting of a polyhydric phenol and an aliphatic polyhydric alcohol, and a hardener therefor, said hardener comprising a mixture of polybasic carboxylic acid anhydrides comprising phthalic anhydride and tetrahydrophthalic anhydride commingled with the 1,2-polyepoxide, the anhydride mixture being present in a proportion corresponding to from about 0.7 to about 1.0 gram equivalent of anhydride groups for each gram equivalent of epoxide groups.

8. A composition of matter comprising a 1,2-polyepoxide reaction product of a halohydrin with a member of the group consisting of a polyhydric phenol and an aliphatic polyhydric alcohol, and a hardener therefor, said hardener comprising a mixture of polybasic carboxylic acid anhydrides comprising phthalic anhydride, tetrahydrophthalic anhydride and hexahydrophthalic anhydride commingled with the 1,2-polyepoxide, the anhydride mixture being present in a proportion corresponding to from about 0.7 to about 1.0 gram equivalent of anhydride groups for each gram equivalent of epoxide groups.

9. A composition of matter comprising a 1,2-polyepoxide reaction product of a halohydrin with a member of the group consisting of a polyhydric phenol and an aliphatic polyhydric alcohol, and a hardener therefor, said hardener comprising a mixture of polybasic carboxylic acid anhydrides comprising phthalic anhydride, tetrahydrophthalic anhydride and succinic anhydride commingled with the 1,2-polyepoxide, the anhydride mixture being present in a proportion corresponding from about 0.7 to about 1.0 gram equivalent of anhydride groups for each gram equivalent of epoxide groups.

10. A composition of matter comprising a 1,2-polyepoxide reaction product of a halohydrin with a member of the group consisting of a polyhydric phenol and an aliphatic polyhydric alcohol, and a hardener therefor, said hardener comprising a mixture of polybasic carboxylic acid anhydrides comprising phthalic anhydride and succinic anhydride commingled with the 1,2-polyepoxide, the anhydride mixture being present in a proportion corresponding to from about 0.7 to about 1.0 gram equivalent of anhydride groups for each gram equivalent of epoxide groups.

11. A composition as claimed in claim 7, wherein the 1,2-polyepoxide is a polyglycidyl ether of 4:4'-dihydroxydiphenyl-dimethylmethane.

12. A composition as claimed in claim 7, wherein a eutectic mixture of the polybasic carboxylic acid anhydrides is employed.

13. The heat hardened reaction product of the composition of claim 7.

14. The heat hardened reaction product of the composition of claim 11.

15. The heat hardened reaction product of the composition of claim 12.

16. A composition of matter comprising a glycidyl polyether of a polyhydric organic compound, said compound selected from the group consisting of polyhydric alcohols and polyhydric phenols, and a hardener therefor, said hardener consisting of a eutectic mixture of phthalic anhydride and succinic anhydride.

References Cited in the file of this patent

UNITED STATES PATENTS

| | | |
|---|---|---|
| 2,324,483 | Castan | July 20, 1943 |
| 2,712,535 | Fisch | July 5, 1955 |
| 2,720,500 | Cody | Oct. 11, 1955 |
| 2,768,153 | Shokal | Oct. 23, 1956 |

FOREIGN PATENTS

| | | |
|---|---|---|
| 133,819 | Australia | July 15, 1946 |
| 511,733 | Belgium | Nov. 24, 1952 |